United States Patent
Lim et al.

(10) Patent No.: US 7,158,758 B2
(45) Date of Patent: Jan. 2, 2007

(54) HIGH-SPEED—WPAN AND METHOD FOR ENABLING COMMUNICATION BETWEEN DEVICES LOCATED IN DIFFERENT PICONETS

(75) Inventors: Se-Youn Lim, Seoul (KR); Seo-Won Kwon, Suwon-si (KR); Jin-Hee Kim, Suwon-si (KR); Jae-Yeon Song, Seongnam-si (KR); Yoon-Sun Lee, Seoul (KR); Jong-Hwa Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 526 days.

(21) Appl. No.: 10/759,687

(22) Filed: Jan. 16, 2004

(65) Prior Publication Data

US 2005/0026569 A1 Feb. 3, 2005

(30) Foreign Application Priority Data

Jul. 31, 2003 (KR) .................... 10-2003-0053261

(51) Int. Cl.
*H04B 7/00* (2006.01)

(52) U.S. Cl. ................ 455/41.3; 455/435.2; 455/443; 370/401

(58) Field of Classification Search ............. 455/41.2, 455/41.3, 501, 507, 509, 418, 419, 420, 422.1, 455/435.1, 2, 436, 443, 463; 370/389, 400, 370/401

See application file for complete search history.

(56) References Cited

U.S. PATENT DOCUMENTS 6,650,871 B1 * 11/2003 Cannon et al. ............ 455/41.2

(Continued)

FOREIGN PATENT DOCUMENTS

EP 1107516 A1 6/2001

(Continued)

OTHER PUBLICATIONS

LAN/MAN Standards Committee of the IEEE Computer Society; Draft P 802, 15, 3, Part 15:3: Wireless Medium Access Control (MAC) and Physical Layer (PHY) Specifications for High Rate Wireless Personal Area Networks WPAN); Feb. 17, 2003; XP002294149; pp. 1-xiv, Chpts 7, 8.

*Primary Examiner*—Lana Le
*Assistant Examiner*—Nhan T. Le
(74) *Attorney, Agent, or Firm*—Cha & Reiter L.L.C.

(57) ABSTRACT

A high-speed WPAN (Wireless Personal Area Network) system for enabling communication between piconets is configured by at least one first device located in the child piconet. A C-PNC (Child Piconet Coordinator) device includes a C-MIB (Child Piconet Management Information Base) stores mapping information associated with devices located in the child piconet and a P-MIB (Parent Piconet Management Information Base) stores mapping information associated with devices located in a parent piconet. At least one second device is located in the parent piconet. The first device includes a C-MIB and a first B-MIB (Bridging Management Information Base), detects destination information of data using the mapping information stored in the first B-MIB to transmit data to a device located in the parent piconet, and transmits the data containing the detected information to the C-PNC device. The C-PNC device broadcasts the mapping information stored in the C-MIB and P-MIB to different piconets, and switches and transmits the data from the first device to the parent piconet. The second device includes a P-MIB and a second B-MIB, and receives the data from the C-PNC device.

11 Claims, 6 Drawing Sheets

U.S. PATENT DOCUMENTS

| | | | |
|---|---|---|---|
| 6,907,227 B1 * | 6/2005 | Fujioka | 455/41.3 |
| 2002/0196771 A1 * | 12/2002 | Vij et al. | 370/349 |
| 2004/0008641 A1 * | 1/2004 | Sugaya et al. | 370/321 |
| 2004/0136338 A1 * | 7/2004 | Lin et al. | 370/329 |
| 2004/0266439 A1 * | 12/2004 | Lynch et al. | 455/444 |

FOREIGN PATENT DOCUMENTS

| | | |
|---|---|---|
| WO | WO 03/047176 | 6/2003 |

* cited by examiner

|  | DEVICE NAME | DEVICE ADDRESS | DEVICE ID | PICONET ID |
| --- | --- | --- | --- | --- |
| PARENT PICONET (60) | P-PNC DEVICE (62) | 55 | 34 | P |
|  | DEVICE G (64) | 45 | 9 | P |
|  | C-PNC DEVICE (42) | 25 | 13 | C/P |
| CHILD PICONET (40) | C-PNC DEVICE (42) | 25 | 13 | C/P |
|  | DEVICE A (46) | 35 | 3 | C |
|  | DEVICE B (48) | 15 | 5 | C |

FIG.4

HIGH-SPEED—WPAN AND METHOD FOR ENABLING COMMUNICATION BETWEEN DEVICES LOCATED IN DIFFERENT PICONETS

CLAIM OF PRIORITY

This application claims priority from an application entitled "HIGH-SPEED WIRELESS PERSONAL AREA NETWORK FOR ENABLING COMMUNICATION BETWEEN DEVICES LOCATED IN DIFFERENT PICONETS AND METHOD FOR TRANSMITTING DATA USING THE SAME," filed in the Korean Intellectual Property Office on Jul. 31, 2003 and assigned Ser. No. 2003-53261, the contents of which are hereby incorporated by reference.

BACKGROUND OF THE INVENTION

1. Field of the Invention

The present invention relates to a high-speed WPAN (Wireless Personal Area Network) based on the IEEE (Institute of Electrical and Electronics Engineers) 802.15.3 standard using an UWB (Ultra Wide Band) frequency. More particularly, the present invention relates to a high-speed WPAN adapted for supporting communication between devices located in different piconets.

2. Description of the Related Art

Typically, wireless communication technologies using an UWB (Ultra Wide Band) transmission frequency can typically communicate between devices at a distance of 10 m~1 km with use of a frequency band of 3.1 GHz~10.6 GHz. The wireless communication technologies using the UWB have been used for military wireless communication technologies in the US D.O.D. (United States-Department of Defense) during the last 40 years, and were recently opened to the private sector by the FCC (Federal Communications Commission).

The wireless communication technologies using the UWB are very high-speed wireless data transmission technologies based on a UWB of several GHz, and have characteristics of a high data rate (e.g., 500 Mbps~1 Gbps) and utilize very low levels of electric power (e.g., 1/100 of the electric power required for a mobile phone and a wireless LAN (Local Area Network)) in comparison with existing IEEE 802.11 (Institute of Electrical and Electronics Engineers) and Bluetooth technologies. The applications of wireless communication technologies using the UWB are varied, and include fields associated with personal area networks (PANs) for connecting computer systems, peripheral devices and home appliances to a very high-speed wireless Internet in a local area (e.g., an average distance of 10 m~20 m and a maximum distance of 100 m), "through-the-wall" radars for detection of objects behind walls of buildings, high-precision positioning and geolocation systems, vehicle collision avoidance sensors, mine detectors, loss prevention systems, detectors for detecting objects inside human bodies, etc.

IEEE 802.15.3 high-speed WPAN (Wireless Personal Area Network) standards are proposed in terms of the wireless communication technologies using the UWB frequencies. In terms of IEEE 802 working groups before IEEE 802.15.3 is described, IEEE 802.15.1 is a working group for standardizing Bluetooth specifications, and IEEE 802.11 is a working group for standardizing wireless LANs.

As a well-known PAN (Personal Area Network) technology, Bluetooth has now reached the stage of commercialization. The Bluetooth technology has been recently adopted and commercialized in an ever-increasing list of products. IEEE 802.11 wireless LANs have been completely standardized. The above-described networks mostly use a frequency band of 2.4 GHz (e.g., an ISM (Industrial, Scientific and Medical) radio band), and are used as a PAN solution within the communication distance of 10 m.

IEEE 802.15.3 working groups include TG1 (Task Group 1), TG2 and TG3. The TG1 is currently conducting the standardization of Bluetooth specifications. The TG2 is analyzing technologies for facilitating coexistence of Bluetooth products and existing wireless LANs. As a group for standardizing high-data-rate PAN solutions, the TG3 studies a transmission scheme for implementing a data rate of 55 Mbps or above.

FIG. 1 is a view illustrating an exemplary piconet formed between devices located in an IEEE 802.15.3 high-speed WPAN.

As shown in FIG. 1, the piconet forming the high-speed WPAN includes a plurality of communication devices 10, 12, 14, 16 and 18. The device 10 acts as a PNC (Piconet Coordinator). The PNC device 10 manages timeslots necessary for communication of the devices located in its own piconet using beacon messages for synchronizing its own device with the devices 12, 14, 16 and 18 connected thereto. Furthermore, the PNC device 10 further performs an operation for controlling QoS (Quality of Service), a power save mode and a piconet access.

An IEEE 802.15.3 device capable of acting as the PNC can form one single piconet. A procedure for forming a piconet by means of a device with the capability of the PNC is as follows.

In order to initiate the operation of the piconet, the PNC device 10 searches for at least one channel selected from all of the channels not currently in use, and broadcasts a beacon frame through the selected channel. In response to the receipt of the beacon frame broadcast by PNC device 10, the devices 12, 14, 16 and 18 carry out a communication channel setup operation. At this time, the PNC device 10 allocates IDs (Identifiers or Identities) corresponding to the devices 12, 14, 16 and 18.

An arbitrary device performs an association procedure when desiring to join an already-formed piconet. In other words, the arbitrary device moves to the already-formed piconet from an external area by requesting that the PNC device 10 connect its own device to the already-formed piconet. In response to the request, the PNC device 10 allocates a single device ID usable in the piconet from which the arbitrary device makes the request.

Throughout the association procedure, the piconet is formed as shown in FIG. 1. When one of the devices 12, 14, 16 and 18, (except for the PNC device 10), desires to transmit data, the particular device or devices 12, 14, 16 and 18 request that the PNC device 10 transmit data, by performing "a data transmission request." In response to the data transmission requests from the one or even all of the devices 12, 14, 16 and 18, the PNC device 10 allocates timeslots for enabling data communications to the devices 12, 14, 16 and 18. Upon allocating the timeslots to the device 12, 14, 16 and 18, the PNC device 10 transmits the allocated timeslots to the devices by using the beacon frame. Consequently, each of the devices 12, 14, 16 and 18, after being informed of their allocated time slots contained in the beacon frame, performs a data transmission operation during their allocated timeslot.

On the other hand, should an arbitrary device desire to terminate a communication operation within the piconet, or where the PNC device 10 desires to release a communication connection with the arbitrary device, a disassociation procedure between the PNC device 10 and the arbitrary device is performed. Thus, the PNC device 10 deletes information of the registered arbitrary device through the piconet disassociation procedure.

The piconet formed between the PNC device 10 and the devices 12, 14, 16 and 18 is classified as both an independent piconet capable of independently allocating timeslots to the devices that are located within the piconet, and a dependent piconet capable of distributing and allocating timeslots provided from a PNC device located outside the piconet to the devices located within the piconet. If at least one dependent piconet is newly generated into an independent piconet, then the independent piconet is referred to as a "parent piconet", and the newly generated dependent piconet is referred to as a "child piconet" or "neighbor piconet". That is, the independent piconet becomes the parent piconet, and the dependent piconet becomes the child piconet. In this case, the child piconet (or dependent piconet) uses a common channel provided from the PNC device located in the parent piconet.

FIG. 2 is an example of both an independent piconet and a dependent piconet, wherein the dependent piconet is formed within the independent piconet. An already-formed piconet becomes a parent piconet 30. A PNC device of the parent piconet 30 is referred to as a P-PNC device 32. Any device with the capability of a PNC device except for the P-PNC device 32 among the devices 22, 24 and 34 can form a child piconet 20.

The P-PNC device 32 allocates timeslots to the C-PNC device 22 and the device 34 forming a child piconet associated with the parent piconet 30 through the transmission of beacon frames containing the allocated timeslots. A device performing a PNC function in the child piconet 20 is referred to as the C-PNC device 22. The C-PNC device 22 can form the child piconet 20, and manages and controls the device 24 forming the child piconet 20. Furthermore, communications within the child piconet 20 can be performed only between the devices 22 and 24 forming the child piconet 20. Thus, the C-PNC device 22 manages and controls the child piconet 20, and is also one member forming the parent piconet 30. The C-PNC device 22 can communicate with the devices 32 and 34 located in the parent piconet 30.

The operation of a neighboring piconet (not shown) is identical to that of the child piconet 20. An N-PNC (Neighbor PNC) device controls devices forming the neighbor piconet is not a member of the parent piconet. Thus, the N-PNC device cannot communicate with the devices of the parent piconet 30 unlike the C-PNC device 22.

FIG. 3 illustrates the configuration of conventional parent and child piconets. A P-PNC (Parent Piconet Coordinator) device 62 manages a C-PNC (Child Piconet Coordinator) device 42 and a device-G 64 that are both members of the parent piconet 60. Furthermore, the C-PNC device 42 manages a device-A 46 and a device-B 48 that are both members of the child piconet 40.

The P-PNC device 62 generates mapping information containing a MAC (Media Access Control) address (64 bits) and a device ID (8 bits) using information transmitted from each of the devices 42 and 64, stores the generated mapping information in a P-MIB (Parent Piconet Management Information Base) 63, and manages the stored generated mapping information. The P-PNC device 62 broadcasts the information of the devices 42 and 64 registered in the parent piconet 60 using beacon frames. Only the devices 42, 62 and 64 that are registered in the parent piconet 60 can receive the beacon frames broadcast by the P-PNC device 62. The devices 42 and 64, which are located in the parent piconet 60, generate mapping information associated with the devices 42 and 64 using information of the beacon frames transmitted from the P-PNC device 62, store the mapping information in P-MIBs 44 and 65, and manage the stored generated mapping information.

When the device G-64 desires to transmit data to the P-PNC device 62, the first step is a search for the mapping information from the P-MIB 65 that refers to an ID of the P-PNC device 62. Subsequently the data is transmitted to the P-PNC device 62. On the other hand, the C-PNC device 42 managing and controlling the child piconet 40 broadcasts information of the device-A 46 and the device-B 48 located in the child piconet 40. The broadcast information is not that registered as the mapping information stored in a C-MIB (Child Piconet Management Information Base) 43. Here, the devices 46 and 48 of the child piconet 40 that are registered in the C-PNC device 42 can only receive the beacon frames.

The device-A 46 and the device-B 48 store, in the C-MIBs 47 and 49, the mapping information associated with the devices registered in the C-MIB 43 of the C-PNC device 42 using the beacon frame information broadcast from the C-PNC device 42, and manages the stored mapping information. Thus, when desiring to transmit data to the device-B 48, the device-A 46 searches for the mapping information stored in the C-MIB 47, refers to ID information of the device-B 48, and transmits the data to the device-B 48.

FIG. 4 is a table illustrating an example of mapping information stored in MIBs. Mapping information stored in the P-MIBs 63, 65 and 44 of the devices 62, 64 and 42 located in the parent piconet 60 contains information associated with device addresses, device IDs and piconet IDs for the devices 62, 64 and 42 located in the parent piconet 60.

Furthermore, mapping information stored in the C-MIBs 43, 47 and 49 of the devices 42, 46 and 48 located in the child piconet 40 contains information associated with device addresses, device IDs and piconet IDs for the devices 42, 46 and 48 located in the child piconet 40.

Since the devices located in the same piconet share the mapping information as described above, the devices located in the same piconet can perform mutual communication with each other.

On the other hand, when desiring to transmit data to the device-G 64 located in the parent piconet 60, the device-A 46 located in the child piconet 40 searches for mapping information from the C-MIB 47 to detect ID information of the device-G 64. However, the ID information of the device-G 64 is not contained in the C-MIB 47. Thus, the device-A 46 cannot transmit corresponding data to the device-G 64. Since the parent piconet 60 and the child piconet 40 are independently configured networks, there is a problem in that communications cannot be performed between the devices located in the different piconets.

In other words, the conventional high-speed WPAN technology can only support communication between the devices located in one piconet, but cannot support communication between the different devices registered in different piconets. Furthermore, there is another problem in that a communication distance between the devices is limited to within a short communication radius of 10 m since the conventional high-speed W PAN technology uses the UWB signal.

Since the PNC device of the child piconet is a member of the parent piconet when the parent and child piconets are formed, the PNC device can communicate with other devices located in the parent piconet. However, other devices except for the PNC device located in the child piconet cannot communicate with devices located in the parent piconet.

SUMMARY OF THE INVENTION

Therefore, the present invention has been made in view of the above problems, and it is an object of the present invention to provide a high-speed WPAN (Wireless Personal Area Network) system for enabling communication between any devices located in different piconets. The mutual communication provides an advantage over conventional cross-piconet communication.

It is another object of the present invention to provide a high-speed WPAN (Wireless Personal Area Network) system for enabling communication between a device located in a parent piconet and a device located in a child piconet, other than the PNC and CNC devices, wherein the child piconet is formed by another device located in the parent piconet.

In accordance with the present invention, the above and other objects can be accomplished by the provision of a high-speed WPAN (Wireless Personal Area Network) system, comprising: at least one first device located in the child piconet; a C-PNC (Child Piconet Coordinator) device including a C-MIB (Child Piconet Management Information Base) that stores mapping information associated with devices located in a child piconet and a P-MIB (Parent Piconet Management Information Base) that stores mapping information associated with devices located in a parent piconet; and at least one second device located in the parent piconet.

Preferably, the first device may include a C-MIB storing the mapping information associated with the devices located in the child piconet, generate mapping information for bridging, store the generated mapping information in a first B-MIB (Bridging Management Information Base) and manage the stored generated mapping information. Preferably, the first device may detect destination information of the data using the mapping information stored in the first B-MIB to transmit data to a device located in the parent piconet, and transmit the data containing the detected information to the C-PNC device.

Preferably, the C-PNC device, which is located in a common area between the parent and child piconets, may include the C-MIB and the P-MIB, broadcast the mapping information stored in the C-MIB and P-MIB to different piconets, and switch and transmit the data from the first device to the parent piconet.

Preferably, the second device may include the P-MIB, generate mapping information for bridging, store the generated mapping information in a second B-MIB, manage the stored generated mapping information and receive the data from the C-PNC device.

Preferably, the mapping information stored in the C-MIB, P-MIB and B-MIB may contain corresponding device addresses, corresponding device IDs (Identifiers and Identities) and IDs of piconets in which the corresponding devices are located.

Preferably, each of the device addresses may be a MAC (Media Access Control) address having 64 bits, and each of the device IDs may have 8 bits.

In accordance with the present invention, the above and other objects can be accomplished by the provision of a method for transmitting data in a high-speed WPAN (Wireless Personal Area Network) system, comprising the steps of: allowing the first device to detect destination information of data to be transmitted from the mapping information stored in the first B-MIB; allowing the first device to transmit the data on the basis of the destination information; allowing the C-PNC device to switch and transmit the data received from the first device to the parent piconet, the C-PNC device broadcasting the mapping information associated with the first and second devices to different piconets; and allowing the second device to receive the data from the C-PNC device.

Preferably, the method may further comprising the steps of: when the second device desires to transmit the data to the first device, allowing the second device to detect information of the first device from the mapping information stored in the second B-MIB and to transmit the data containing the detected information to the C-PNC device; and allowing the C-PNC device to transmit the data from the second device to the first device using the mapping information stored in the C-MIB.

As apparent from the above description, the present invention provides a high-speed WPAN system that broadcasts information concerning devices located in different piconets, and transmits data using B-MIBs that store not only mapping information of devices located in the same piconet but also mapping information of the devices located in different piconets, such that data between the devices located in the different piconets can be transmitted. Furthermore, the high-speed WPAN system performs communications based on a bridging protocol that supports communications between devices located in different piconets, such that a data transmission area can be extended in the high-speed WPAN system.

BRIEF DESCRIPTION OF THE DRAWINGS

The above and other objects, features and other advantages of the present invention will be more clearly understood from the following detailed description taken in conjunction with the accompanying drawings, in which:

FIG. 4 is a table that illustrates mapping information stored in MIBs (Management Information Bases);

DETAILED DESCRIPTION OF THE PREFERRED EMBODIMENTS

Figure 1:
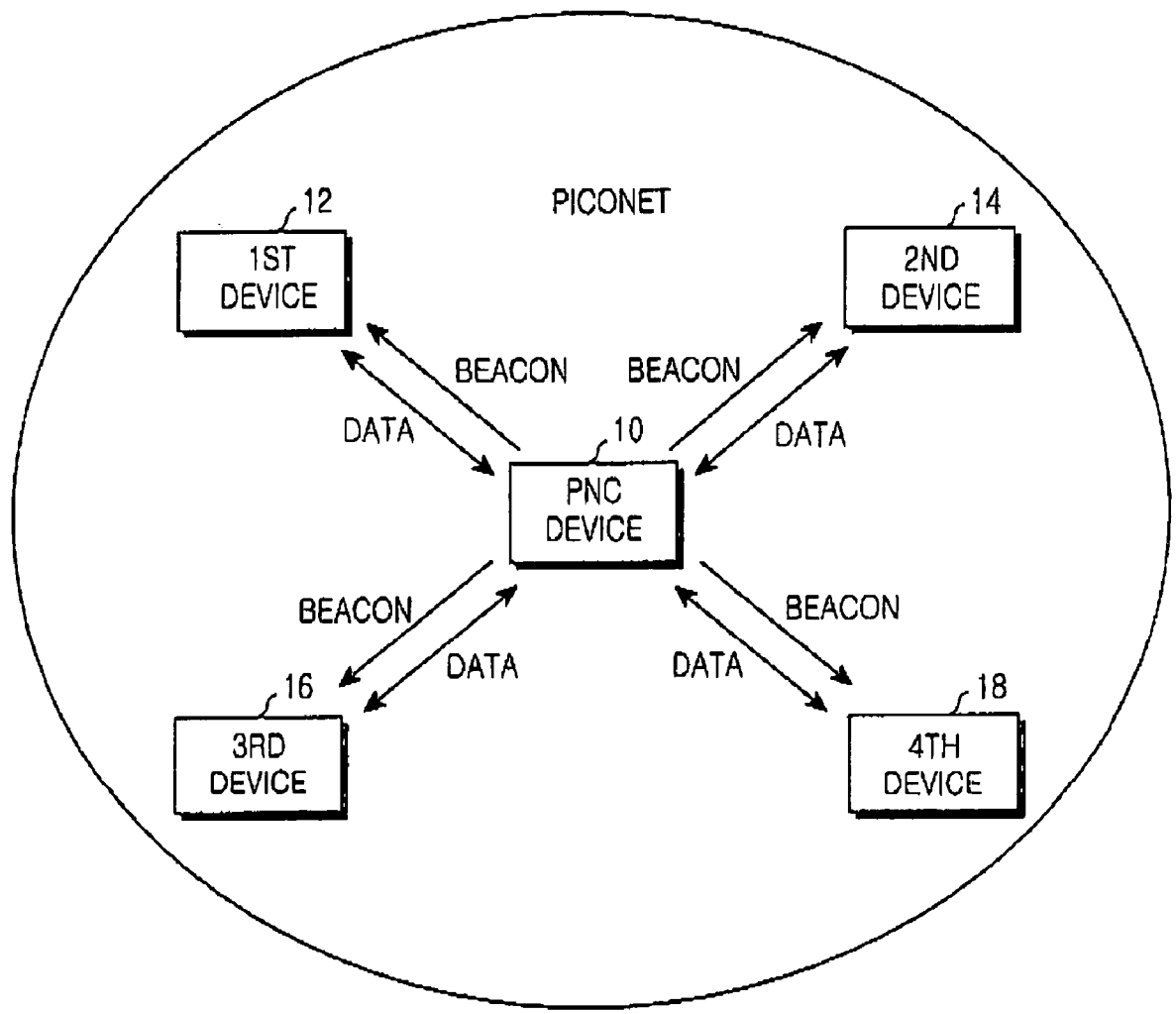
FIG. 1 illustrates an exemplary piconet formed between devices located in an IEEE 802.15.3 high-speed WPAN (Wireless Personal Area Network)
Figure 2:
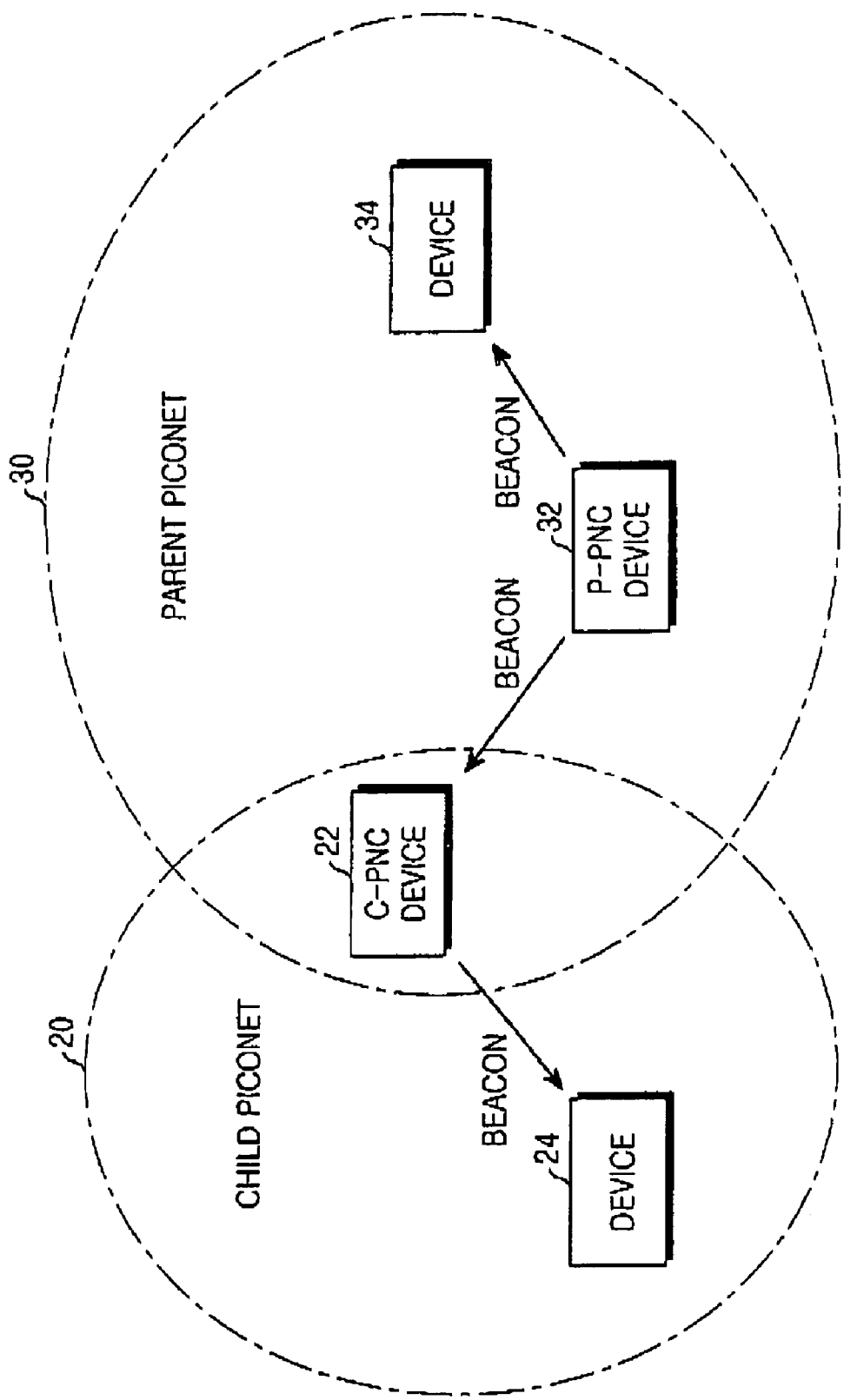
FIG. 2 illustrates an independent piconet and a dependent piconet formed within the independent piconet.
Figure 3:
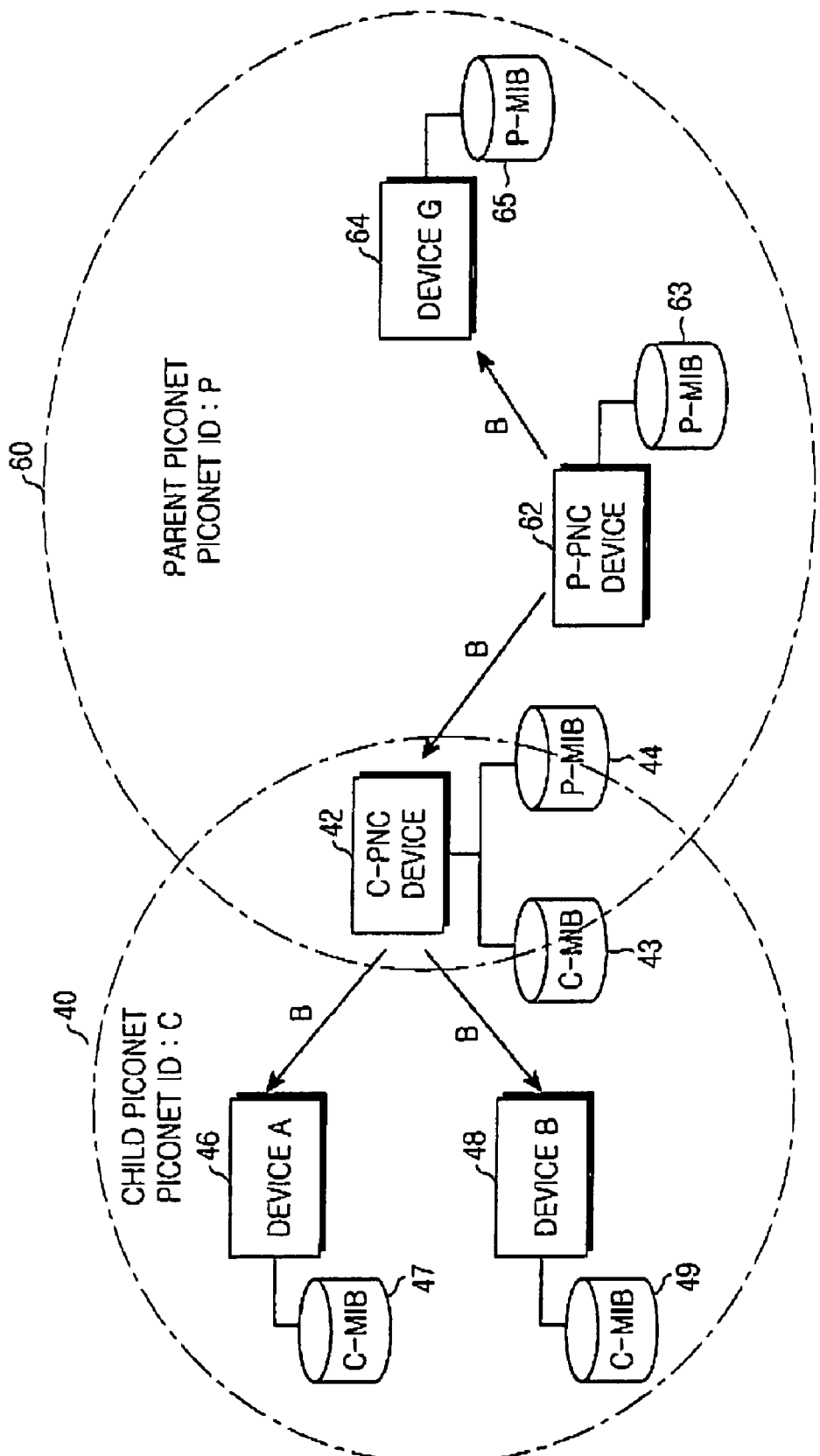
FIG. 3 illustrates the configuration of the conventional parent and child piconets.

Now, preferred embodiments of the present invention will he described in detail with reference to the annexed drawings. The same or similar elements are often denoted by the same reference numerals, even though they are depicted in different drawings. In the following description made in conjunction with preferred aspects of the present invention, a variety of specific elements are shown. The description of such elements has been made only for a better understanding of the present invention. Those skilled in the art will appreciate that the present invention can be implemented without using the above-mentioned specific elements. Also, in the following description, a detailed description of known functions and configurations incorporated herein will be omitted when it may obscure the subject matter of the present invention.

Figure 5:
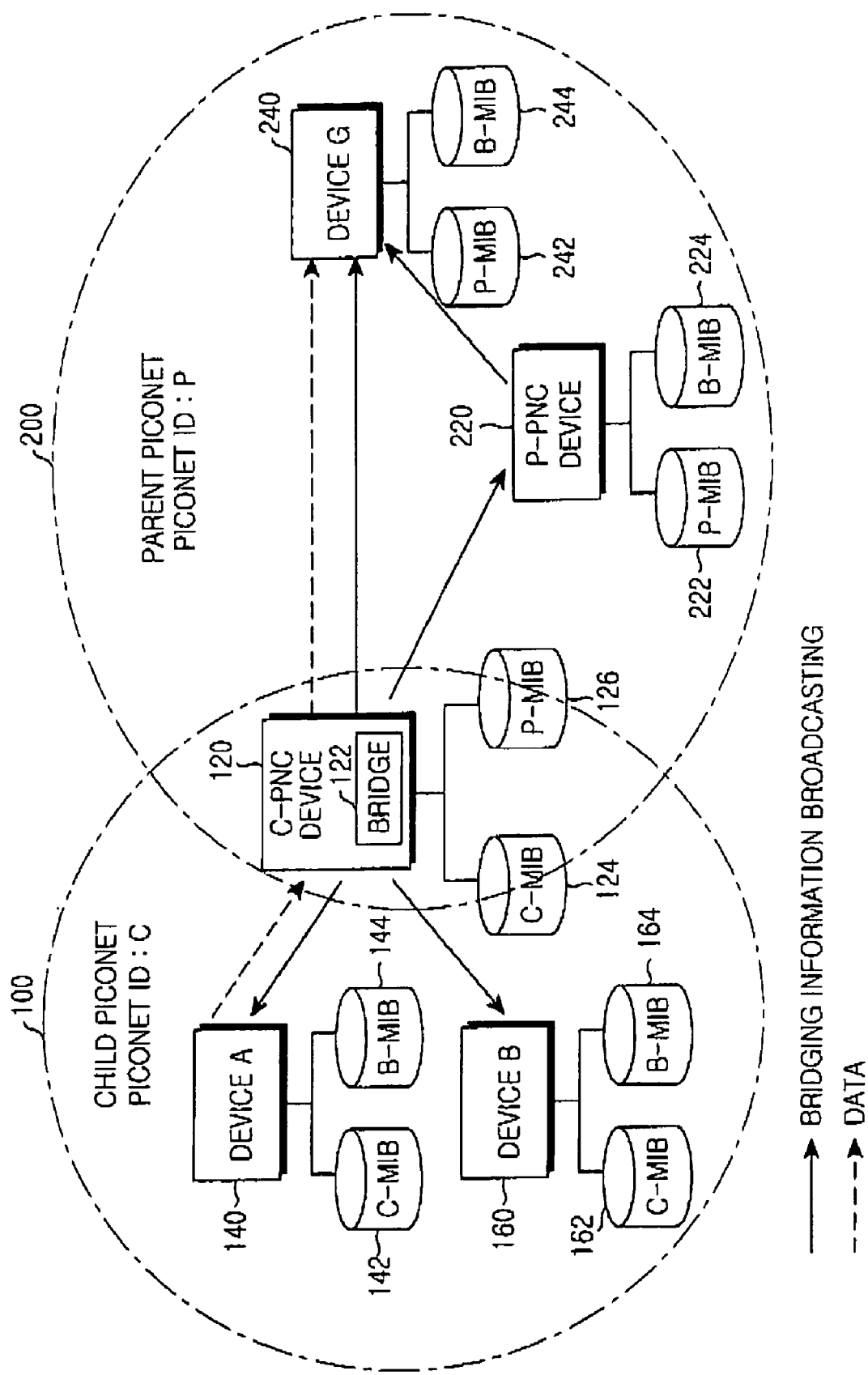
FIG. 5 is a block diagram of a high-speed WPAN (Wireless Personal Area Network) system that enables communication between devices located in different piconets in accordance with a preferred embodiment of the present invention.

FIG. 5 is a block diagram illustrating a high-speed WPAN (Wireless Personal Area Network) system for enabling communication between devices located in different piconets in accordance with a preferred aspect of the present invention.

As shown in FIG. 5, the high-speed WPAN system of the present invention includes a bridge-capable device and a plurality of devices in addition to the bridging capable device.

The bridge-capable device broadcasts information of the devices located in respective piconets to the devices located in different piconets, and there device does not have to be a CNC or PNC, as was the case in prior art piconets. The information of the devices located in the different piconets is referred to as "bridging information". Upon receiving the information of the devices located in the different piconets, the devices generate a B-MIB (Bridging Management Information Base) through the received device information, respectively. On the other hand, the bride-capable device performs a function of switching data transmitted from the devices located in the different piconets.

In accordance with the present invention, the bride-capable device is set as a C-PNC (Child Piconet Coordinator) device 120. Thus, the C-PNC 120 includes a bridge 122 for switching data transmitted from among the different piconets.

In the high-speed WPAN system shown in FIG. 5, a parent piconet 200 and a child piconet 100 are configured as different piconets. Here, the "P" denotes an ID (Identifier or Identity) of the parent piconet 200, and the "C" denotes an ID of the child piconet 100. In this case, it is assumed that information associated with the addresses and IDs of the child and parent piconets 100 and 200 is identical to information shown in FIG. 4.

A P-PNC (Parent Piconet Coordinator) device 220 manages the C-PNC device 120 having the bridging function and a device-G 240 being members of the parent piconet 200. Furthermore, the C-PNC device 120 manages a device-A 140 and a device-B 160 being members of the child piconet 100.

The P-PNC device 220 generates mapping information containing a MAC (Media Access Control) address (64 bits), a device ID (8 bits) and a piconet ID using information transmitted from each of the devices 120 and 240 located in the parent piconet 200, stores the generated mapping information in a P-MIB (Parent Piconet Management Information Base) 222, and manages the stored generated mapping information. The P-PNC device 220 broadcasts the information of the devices 120 and 240 registered in the parent piconet 200 using beacon frames. The C-PNC device 120 and the device-G 240 generate mapping information using the information obtained in part from the beacon frames broadcast by the P-PNC device 220, and stores the mapping information in P-MIBs 126 and 242, and manages the stored generated mapping information.

Thus, the devices 220, 120 and 240 located in the parent piconet 200 share the mapping information stored in the P-MIB 222, 126 and 242 and mutually perform communication using the shared mapping information.

The C-PNC device 120 broadcasts the information of the device-A 140 and device-B 160 of the child piconet 100 registered in a C-MIB (Child Piconet Management Information Base) 124 using the beacon frames. The device-A 140 and the device-B 160 configure information of the C-MIBs 142 and 162 for the devices located in the child piconet 100 using the beacon frame information broadcast by the C-PNC device 120.

Thus, the devices 120, 140 and 160 located in the child piconet 100 mutually perform communication using the shared C-MIBs 124, 142 and 162, respectively.

On the other hand, the C-PNC device 120, which comprises the bridge capable device, contains different-piconet information items, i.e., both the C-MIB 124 storing mapping information for the devices located in the child piconet 100 and the P-MIB 126 storing mapping information for the devices located in the parent piconet 200.

The C-PNC device 120 broadcasts the mapping information stored in the P-MIB 126 to the devices 140 and 160 located in the child piconet 100 and broadcasts the mapping information stored in the C-MIB 124 to the devices 220 and 240 located in the parent piconet 200.

The device-A 140 and the device-B 160 located in the child piconet 100 generate mapping information for bridging associated with the devices 220 and 240 located in the parent piconet 200 using the mapping information broadcast by the C-PNC device 120, and store the generated mapping information in B-MIBs (Bridging Management Information Bases) 144 and 164, and manages the stored generated mapping information.

The P-PNC device 220 and the device-G 240 located in the parent piconet 200 generate mapping information for bridging associated with the devices 140 and 160 located in the child piconet 100 using the mapping information broadcast by the C-PNC device 120, store the generated mapping information in B-MIBs 224 and 244, and manages the stored generated mapping information.

Thus, upon transmitting data to the devices located in the different piconets, the devices 140, 160, 220 and 240 can refer to the B-MIBs and transmit the data to destination devices, respectively.

For example, when desiring to transmit data to the device-G 240, the device-A 140 refers to the mapping information stored in the B-MIB 144, detects a MAC address, a device ID and a piconet ID for the device-G 240, inserts the detected mapping information into a header of the data, and transmits the data to the C-PNC device 120 during an allocated timeslot.

The C-PNC device 120 analyzes the header of the data transmitted from the device-A 140 and confirms a destination associated with the data to be transmitted. The C-PNC device 120 controls a bridge 122 to perform a bridging function for transmitting the data from the device-A 140 to the device-G 240. Thus, data from a device located in the child piconet 100 is transmitted to a device located in the parent piconet 200 using the bridging function.

The high-speed WPAN system thus enables communication between devices located in different piconets through a bridging protocol, such that a communication distance can be extended in the high-speed WPAN.

Figure 6:
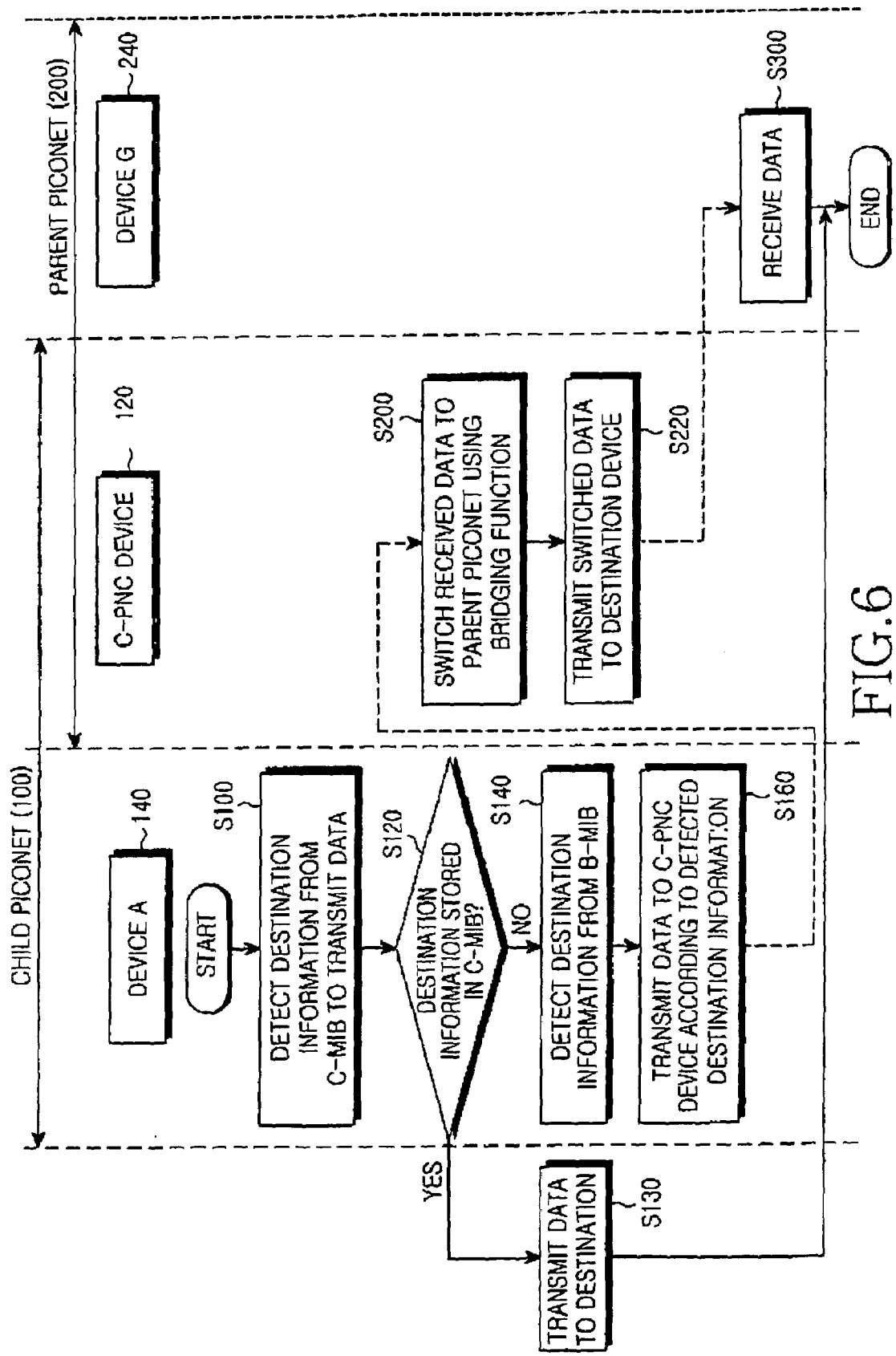
FIG. 6 is a flow chart illustrating a method for transmitting data between devices located in different piconets using a high-speed WPAN in accordance with a preferred embodiment of the present invention.

FIG. 6 is a flow chart illustrating a method for transmitting data between devices located in different piconets using a high-speed WPAN in accordance with a preferred embodiment of the present invention.

The device-A 140, when desiring to transmit data to an arbitrary device 0 located in the child piconet 100 confirms mapping information stored in the MIBs 142 and 144 to identify a piconet in which a destination device is located. In other words, the device-A 140 detects mapping information associated with the destination device from the C-MIB 142 (S100).

At this time, the device-A 140 determines whether the mapping information associated with the destination device is stored in the C-MIB 142 (S120). If the mapping information associated with the destination device is stored in the C-MIB 142, the device-A 140 determines that the destination device is located in the child piconet 100 and transmits the data to a destination registered in the child piconet 100 (S130). At this time, the destination device can be the device-B 160 or the C-PNC device 120.

On the other hand, if the device-A 140 determines that the mapping information associated with the destination device is not stored in the C-MIB 142 at the above step 120, the device-A 140 determines that the destination device is located in another piconet rather than within the child piconet 100. In accordance with this embodiment, the device-A 140 determines that the destination device is located in the parent piconet 200. Thus, the device-A 140 detects the mapping information associated with the destination device from the B-MIB 144 (S 140).

The device-A 140 inserts the mapping information associated with the destination device into the data on the basis of the detected destination information and then transmits the data to the C-PNC device 120 (S160). Here, the destination device information contains an address of the destination device, an ID of the destination device, an ID of a piconet in which the destination device is located, etc. In accordance with this embodiment, the case where the destination device is the device-G 240 located in the parent piconet 200 will be exemplarily described.

The C-PNC device 120 receiving the data from the device-A 140 switches the received data to the parent piconet 200 using the bridging function of the bridge 122 (S200). Thus, the C-PNC device 120 transmits the switched data to the device-G 240 (S220). Then, the device-G 240 receives the data from the C-PNC device 120 (S300).

As described above, data is transmitted to a C-PNC (Child Piconet Coordinator) device having a bridging function using mapping information stored in a B-MIB (Bridging Management Information Base) storing information of devices located in another piconet and the C-PNC device switches and transmits received data to a destination device, such that a data transmission operation between devices located in different piconets is enabled. Consequently, a data transmission area can be extended in a high-speed WPAN (Wireless Personal Area Network).

As apparent from the above description, the present invention provides a high-speed WPAN system, which can broadcast information of devices located in different piconets and transmit data using B-MIBs storing not only mapping information of devices located in the same piconet but also mapping information of the devices located in the different piconets, such that data between the devices located in the different piconets can be transmitted.

Furthermore, the high-speed WPAN system performs communications based on a bridging protocol supporting communications between devices located in different piconets, such that a data transmission area can be extended in the high-speed WPAN system.

Although the preferred embodiments of the present invention have been disclosed for illustrative purposes, those skilled in the art will appreciate that various modifications, additions and substitutions are possible, without departing from the scope of the invention and the appended claims.

Therefore, the present invention is not limited to the above-described embodiments and drawings.

What is claimed is:

1. A high-speed WPAN (Wireless Personal Area Network) system configured by a previously-formed parent piconet including a plurality of devices and a child piconet that is newly-formed using at least one timeslot allocated by a device located in the parent piconet, comprising:

at least one first device, located in the child piconet that includes a C-MIB (Child Piconet Management Information Base) for storing mapping information associated with devices located in the child piconet, the first device receiving information concerning at least one of the plurality of devices that are located in the parent piconet, generating mapping information for bridging, and storing the generated mapping information in a first B-MIB (Bridging Management Information Base), detecting information of a destination device from the mapping information stored in the first B-MIB and transmitting the data containing the detected information;

at least one C-PNC (Child Piconet Coordinator) device, located in a common area between the parent and child piconets, including a C-MIB and a P-MIB (Parent Piconet Management Information Base) for storing mapping information associated with the devices located in the parent piconet, wherein the C-PNC device broadcasts the mapping information stored in the C-MIB and P-MIB to different piconets and switches and transmitts the data from the first device to the parent piconet; and at least one second device, located in the parent piconet, including a P-MIB, the second device generating mapping information for bridging associated with the devices located in the child piconet from the mapping information broadcast by the C-PNC device, storing the generated mapping information in a second B-MIB and receiving the data from the C-PNC device.

2. The high-speed WPAN system as set forth in claim 1, wherein the mapping information stored in the C-MIB, P-MIB and B-MIB contains device addresses, device IDs (Identifiers and Identities) and IDs of different piconets in which corresponding devices in the different piconets are located.

3. The high-speed WPAN system as set forth in claim 2, wherein each of the device addresses comprises a MAC (Media Access Control) address.

4. The high-speed WPAN system as set forth in claim 3, wherein the MAC address comprises about 64 bits.

5. The high-speed WPAN system as set forth in claim 2, wherein each of the device IDs comprises 8 bits.

6. The high-speed WPAN system as set forth in claim 1, wherein the second device detects information of the first device from the mapping information stored in the second B-MIB and transmits data containing the detected information to the C-PNC device, wherein when the second device desires to transmit the data to the first device, and the C-PNC device transmits the data from the second device to the first device using the mapping information stored in the C-MIB.

7. A method for transmitting data using a high-speed WPAN (Wireless Personal Area Network) system configured by a previously-formed parent piconet including a plurality of devices and a child piconet newly-formed using at least one timeslot allocated by a device located in the parent piconet, the high-speed WPAN system comprising: a first device, located in the child piconet, including a C-MIB (Child Piconet Management Information Base) for storing mapping information associated with devices located in the child piconet and a first B-MIB (Bridging Management Information Base) for storing mapping information to be bridged to the devices located in the parent piconet; at least one C-PNC (Child Piconet Coordinator) device, located in a common area between the parent and child piconets, including a C-MIB and a P-MIB (Parent Piconet Management Information Base) for storing mapping information associated with the devices located in the parent piconet; and a second device, located in the parent piconet, including a P-MIB and a second B-MIB for storing mapping information to be bridged to the devices located in the child piconet, said method comprising the steps of:

(a) detecting destination information of data by the first device, said destination information to be transmitted from the mapping information stored in the first B-MIB;

(b) transmitting by the first device the data on the basis of the destination information;

(c) switching and transmitting by the C PNC device of the data received from the first device to the parent piconet, wherein the C-PNC device broadcasts the mapping information associated with the first and second devices to different piconets; and wherein the second device receives the data from the C-PNC device.

8. The method as set forth in claim 7, wherein the mapping information associated with the first and second devices and the mapping information stored in the first and second B-MIBs contain device addresses, device IDs (Identifiers and Identities) and IDs of different piconets in which corresponding devices are located.

9. The method as set forth in claim 7, further comprising the steps of:

(d) detecting information by the second device of the first device that is obtained from the mapping information stored in the second B-MIB, and transmitting the data containing the detected information to the C-PNC device; and (e) transmitting the data by the C-PNC device from the second device to the first device using the mapping information stored in the C-MIB.

10. A method for transmitting data using a high-speed WPAN (Wireless Personal Area Network) system configured by a previously formed parent piconet that includes a plurality of devices and a child piconet newly formed using at least one timeslot allocated by a device located in the parent piconet, the high-speed WPAN system comprising: a first device, located in the child piconet, including a C-MIB (Child Piconet Management Information Base) for storing mapping information associated with devices located in the child piconet and a first B-MIB (Bridging Management Information Base) for storing mapping information to be bridged to the devices located in the parent piconet, and at least one C-PNC (Child Piconet Coordinator) device, located in a common area between the parent and child piconets, including a C-MIB and a P-MIB (Parent Piconet Management Information Base) for storing mapping information associated with the devices located in the parent piconet; and a second device, located in the parent piconet, including a P-MIB and a second B-MIB for storing mapping information to be bridged to the devices located in the child piconet, said method comprising the steps of:

(a) detecting destination information of data by the second device to be transmitted from the mapping information stored in the second B-MIB;

(b) transmitting the data from the second device on the basis of the destination information;

(c) switching and transmitting the data received by the C-PNC device from the second device to the child piconet, the C-PNC device broadcasting the mapping information associated with the first and second devices to different piconets; and (d) receiving the data from the C-PNC device by the first device.

11. The method as set forth in claim 10, further comprising the steps of:

(e) detecting information by the first device of the second device obtained from the mapping information stored in the first B-MIB and transmitting the data containing the detected information to the C-PNC device; and (f) transmitting the data from the C-PNC device from the first device to the second device using the mapping information stored in the P-MIB.

* * * * *